United States Patent [19]

Kretschmer

[11] 4,093,312
[45] June 6, 1978

[54] FASTENING ARRANGEMENT FOR DECORATIVE WHEEL RINGS

[76] Inventor: Paul Kretschmer, Höhenstr. 18, 8752 Waldaschaff, Germany

[21] Appl. No.: 734,442

[22] Filed: Oct. 21, 1976

[30] Foreign Application Priority Data

Oct. 21, 1975 Germany ............................ 2547064

[51] Int. Cl.² ................................................ B60B 7/06
[52] U.S. Cl. .................................. 301/37 R; 301/37 P
[58] Field of Search .............. 301/37 R, 37 P, 37 TC, 301/37 ST, 37 T, 37 C, 37 CD, 37 TP, 37 PB, 37 B; 24/73 B, 73 HC

[56] References Cited

U.S. PATENT DOCUMENTS

| 3,006,691 | 10/1961 | Lyon ................... | 301/37 T |
| 3,012,822 | 12/1961 | Mulhern .............. | 301/37 R |
| 3,146,032 | 8/1964 | Furman ............... | 301/37 B |
| 3,746,397 | 7/1973 | Buerger .............. | 301/37 R |
| 3,773,390 | 11/1973 | Foster et al. ....... | 301/37 R |
| 3,873,161 | 3/1975 | Kretschmer ......... | 301/37 P |

FOREIGN PATENT DOCUMENTS

| 621,486 | 6/1961 | Italy ..................................... | 24/73 B |
| 1,128,902 | 10/1968 | United Kingdom ............ | 301/37 TP |

Primary Examiner—Robert B. Reeves
Assistant Examiner—Charles A. Marmor
Attorney, Agent, or Firm—Maurice A. Moffat

[57] ABSTRACT

The present invention relates to a decorative wheel ring comprising a spring clip for engagement in the rim of a wheel of a motor vehicle the ring having a fastening for a spring clip which is in the form of a three-legged spring loop including tangs which, after the arrangement has been pressed into the dish of the rim, engage the wall of the wheel dish and thus hold the decorative wheel ring freely suspended on the wheel of the vehicle. The tangs are arranged on the center portion of the spring clip, and the ring is provided with a guide slot adapted to receive the outer free leg of the spring clip. The ring is also provided with an extension serving as an axial stop for the inner free leg of the spring clip which embraces said extension.

2 Claims, 6 Drawing Figures

U.S. Patent  June 6, 1978  4,093,312
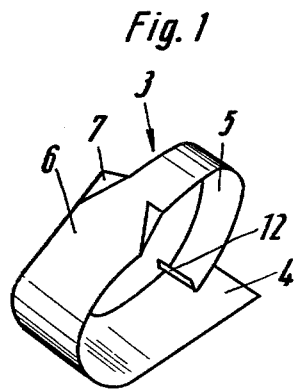
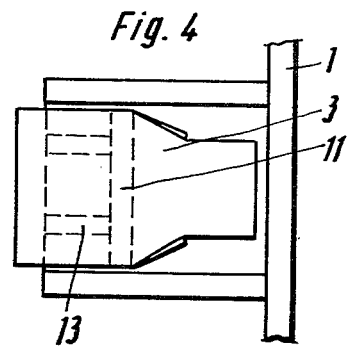
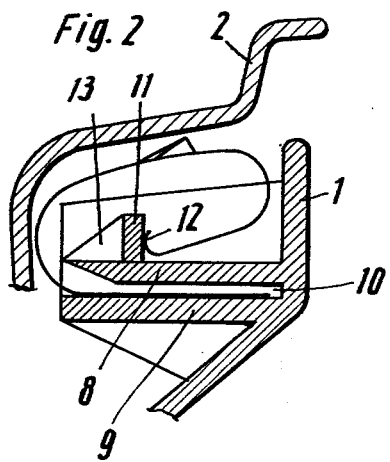
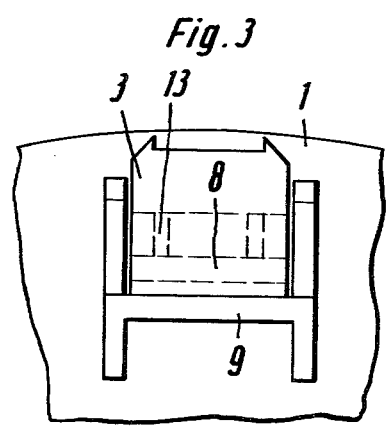
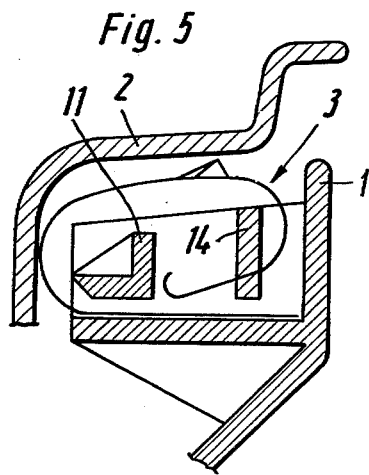
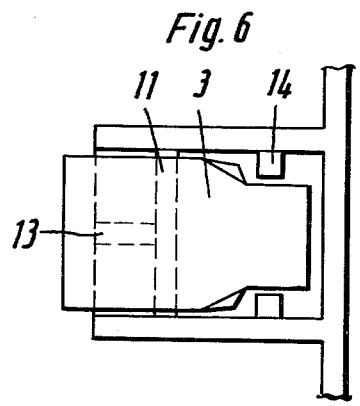

FASTENING ARRANGEMENT FOR DECORATIVE WHEEL RINGS

This invention relates to a decorative wheel ring and, in particular, to a spring clip to fasten it in the rim of a wheel of a motor vehicle. German Gebrauchsmuster No. 7 127 621.6 describes a decorative wheel ring comprising clips to fasten the decorative wheel ring within the rim of the wheel of the motor vehicle, where the decorative wheel ring comprises an inwardly directed supporting flange and a superimposed crossbar betwen which a spring clip having a triple loop portion is clamped together with its center portion and with its inner free end, while the outer free end includes a nose which penetrates the walls of the wheel dish after the arrangement has been pressed into the wheel dish, thus holding the decorative wheel ring freely suspended on the wheel.

This known arrangement has had some disadvantages. There is, for instance, and for the purpose of cohesion between the parts under normal traffic speed, a necessary dimension, which gives the free legs of the clips a high degree of pre-stess. In combination with frequent load changes due to the unevenness of the road or uneven distribution of load on the wheels this can, in the bent area of the spring loop, easily lead to breakage of the loop. There are also additional difficulties in dismantling the decorative ring because of the interlocking effect of the clips in direction of the removal, since the interlocking results in excessive upward bending of the spring clip and therefore at the same time puts too much of a bending stress on the clip in the bent area of the spring clip. In order to overcome this disadvantage, it is known from the above mentioned Gebrauchsmuster to provide the outer free end of the spring clip, which comprises claws, with an extension which projects beyond the claws and which abuts the inner wall of the wheel dish when the clip is bent upwardly, thereby limiting the bending angle of the spring clip. This does not eliminate the above described disadvantage since the extension which reaches beyond the noses loses its property as soon as it leaves the area of the wheel dish, from which moment on the clawing effect of the noses is again in full force.

Essentially the same disadvantages exist in the case of another two-legged known spring clip, where one of the two legs is, by means of a nose, clamped in a guide slot. In that case, there exists in addition to the above described disadvantages the further disadvantage that on the one hand the guide slot of the decorative ring, usually of plastic, is worn out due to the changing load conditions, whereby the clip loosens and, furthermore, in case of the breakage of a clip, the portion of the clip which remains in the slot cannot be removed without damage to the decorative ring.

It is the object of the present invention to create a decorative wheel ring which allows an uncomplicated mounting and dismantling as well as a secure fastening of the decorative wheel ring within the rim, and this is achieved by arranging the claws or tangs on the centre portion of the spring loop having three legs forming a three-legged spring clip with the decorative wheel ring being provided with two or more clip support portions containing a guide slot in order to receive the outer free leg of the spring loop of the spring clip, the decorative wheel ring also including, adjacent the guide slot, and on the clip support portion an upwardly projecting extension which serves as a buffer or stop for the inner free leg of the spring loop of the spring clip which embraces the extension.

The invention is illustrated, by way of example, in the accompanying drawings in which:

FIG. 1 is a diagrammatic perspective view of one form of spring clip;

FIG. 2 is a diagrammatic section through a rim with a decorative wheel ring arranged therein in the area of a first form of spring clip;

FIG. 3 is a diagrammatic view taken from the left side of the decorative wheel ring/spring clip arrangement shown in FIG. 2;

FIG. 4 is a diagrammatic plan view of the decorative wheel ring/spring clip arrangement shown in FIG. 2;

FIG. 5 is a diagrammatic section of a different form of spring clip support; and FIG. 6 is a diagrammatic plan view of the decorative wheel ring/spring clip arrangement shown in FIG. 5.

Referring now to the drawings, 2 designates the rim, 1 indicates the decorative wheel ring of a wheel of a motorvehicle, which is held in rim 2 by means of a spring loop having three legs and forming a three-legged spring clip which, in FIG. 1, is indicated generally at 3. Similar spring clips are equally spaced dispersed over the entire circumference of the decorative wheel ring such as, for example, six in number. The three-legged spring clip includes an outer free end or outer leg 4 of the spring loop, an inner free end or inner leg 5 of the spring loop and a central portion or leg 6 of the spring loop which is provided with projecting tangs 7. The decorative wheel ring 1 (see also FIGS. 2–4) is provided with a clip support portion for each spring clip, containing a guide slot 10 defined by a pair of axially extending ribs 8 and 9, and adapted to receive the spring loop's outer free end or leg 4 of the spring clip 3. Each clip support portion of the wheel ring 1 is also provided with a flange or extension 11 projecting from, and normal to, the rib 8. The flange or extension 11 serves as an axial stop for spring loop's the free inner leg 5 of the spring clip 3, which leg embraces the extension 11. The terminal end of the inner free leg 5 of the spring clip comprises a bend 12 which forms an angle of approximately 90° with the remainder of leg 5. Flange 11 is also provided with a pair of angled ramps 13 which serve as sliding surfaces to receive the inner free leg 5 of spring clip 3.

In order to mount spring clip 3 on the decorative wheel ring, the outer free leg 4 of the clip is slipped into the guide slot 10 of the decorative wheel ring 1, so that free leg 5 will guide up the slanted ram 13, until, due to the spring effect of the clip, leg 5 will drop over the ramps and will seat itself behind, and abutting, extension 11.

The spring clip is thus already fastened to the decorative wheel ring, which now, first under the tension of bending between the outer free leg 4 and the central portion or leg 6, and thereafter, because of the resting of inner leg 5 upon rib 8, is clamped in the wheel dish under the tension between the inner free leg 5 and the central portion or leg 6. At the same time, tangs 7 will engage the rim 2, whereby fastening of the decorative wheel ring to the rim is achieved.

For dismantling purposes, it is merely sufficient to pull the arrangement by the decorative wheel ring, so that the tangs 7 change from their interlocked position into sliding position due to the release of the bending between the outer leg 4 and central leg 6. The angle of the upward bend is limited to a maximum degree of bending in the range of elastic deformation, by the amount of support of inner leg 5 upon extension 11, whereby the limitation is additionally ensured by the fact that, if a certain angle of upward bend is reached, the edge of bend 12 bites into extension 11 and prevents further upward bending.

The version shown in FIGS. 5 and 6 differs from the version shown in FIGS. 2–4 simply in that the rib 8 is omitted, and in that additionally, for the purpose of lateral stabilization of the clip, guide bars or lugs 14 are provided. The advantage of this version lies in the fact that on the one hand the bending radius of both legs 4 and 5 is equal, which thereby reduces the danger of breakage, and also in that the spring legs support each other, which eliminates fraction of the fastening. A more pronounced bending of the narrow end of the spring results in a better rolling-off motion of the spring.

The invention thus creates a support for a spring clip for a decorative wheel ring where the supports for the spring clip can easily be formed right onto the decorative wheel ring and where the clamping force which is necessary to hold the decorative wheel ring in the rim, is produced by both radially supported free legs of the spring loop instead by only one leg. Due to the existing axial support, at least of the inner leg of the clip, a more than proportional increase of the clamping effect occurs which allows a significant reduction of the pre-stressing of the spring clip during mounting of the decorative wheel ring.

Due to the axial support of the inner leg of the spring clip on the extension, the danger of an excessive upward bending of the spring clip including a plastic deformation of the decorative wheel ring during mounting is avoided because of the interlocking within the rim. It is a further advantage that any desired tension of the clip can be achieved by shortening or lengthening of the inner leg of the spring clip without changing the thickness or quality of the material. The spring can have a shorter total length than the known spring clips, whereby at the same time also the effects on the radial support are minimized.

Advantageously the end of the inner free leg is bent inwardly at a 90° angle, whereby during the tension of the spring which occurs during dismantling, a temporary interlocking of the inner leg at the extension occurs which ensures the limitation of the upward bending angle at the desired maximum degree.

I claim:

1. A decorative wheel ring comprising at least two spring clips for engagement in the rim of a wheel of a motor vehicle, the decorative wheel ring being provided with a clip support portion for each spring clip, wherein each spring clip has the form of a three-legged spring loop comprising an outer free leg joined at its one end to a central portion through a first bent portion, and an inner free leg joined to said central portion through a second bent portion, including tangs on said central portion which, after the decorative wheel ring together with said spring clips inserted in said clip support portions has been pressed into the wheel dish of the rim, engage the wall of the wheel dish and thus hold the decorative wheel ring freely suspended on the wheel of the vehicle, each clip support portion on the decorative wheel ring being provided with an axially extending guide slot adapted to receive said outer free leg of the spring loop of the spring clip, wherein said clip support portion also contains a projecting extension serving as an axial stop for the inner free leg of said spring loop of the spring clip which embraces said extension and forces said tangs against said rim thereby to secure said ring.

2. A decorative wheel ring according to claim 1, wherein the end of the inner free leg of said spring loop of the spring clip is provided with a flange portion which forms an angle of approximately 90° with the remainder of said inner free leg of the spring loop, said flange on the inner leg of the spring loop being disposed and adapted to have the same general direction as said projecting extension of said clip support portion, and said flange also being adjacent to and capable of resting against said projecting extension of the clip support portion upon insertion of said spring clip into said clip support portion on the decorative wheel ring.

* * * * *